6 Sheets—Sheet 1.

C. H. TRASK & H. F. WHEELER,

Assignors to the LYNN LASTING MACHINE ASSOCIATION.

Machinery for Lasting Boots and Shoes.

No. 8,627. Reissued Mar. 18, 1879.

Witnesses.

L. F. Connor.

A. E. Whitney

Inventor.

Charles H. Trask.

Henry F. Wheeler by Crosby & Gregory

Attys

THE NORRIS PETERS CO., PHOTO-LITHO., WASHINGTON, D. C.

6 Sheets—Sheet 2.

C. H. TRASK & H. F. WHEELER,

Assignors to the LYNN LASTING MACHINE ASSOCIATION.

Machinery for Lasting Boots and Shoes.

No. 8,627. Reissued Mar. 18, 1879.

Witnesses.

L. F. Connor.

N. E. Whitney.

Inventor.

Charles H. Trask, and

Henry F. Wheeler, by Crosby & Gregory, Attys

THE NORRIS PETERS CO., PHOTO-LITHO., WASHINGTON, D. C.

C. H. TRASK & H. F. WHEELER,

Assignors to the LYNN LASTING MACHINE ASSOCIATION.

Machinery for Lasting Boots and Shoes.

No. 8,627. Reissued Mar. 18, 1879.

Witnesses.
L. F. Connor.
N. E. Whitney

Inventor.
Charles H. Trask, and
Henry F. Wheeler,
by Crosby & Gregory, Attys.

THE NORRIS PETERS CO., PHOTO-LITHO., WASHINGTON, D. C.

6 Sheets—Sheet 4.

C. H. TRASK & H. F. WHEELER,

Assignors to the LYNN LASTING MACHINE ASSOCIATION.

Machinery for Lasting Boots and Shoes.

No. 8,627. Reissued Mar. 18, 1879.

Witnesses.

L. F. Connor.

N. E. Whitney.

Inventors

Charles H. Trask, and

Henry F. Wheeler.

by Crosby & Gregory

Atty.

THE NORRIS PETERS CO., PHOTO-LITHO., WASHINGTON, D. C.

C. H. TRASK & H. F. WHEELER,
Assignors to the LYNN LASTING MACHINE ASSOCIATION.
Machinery for Lasting Boots and Shoes.
No. 8,627. Reissued Mar. 18, 1879.
Fig. 5.
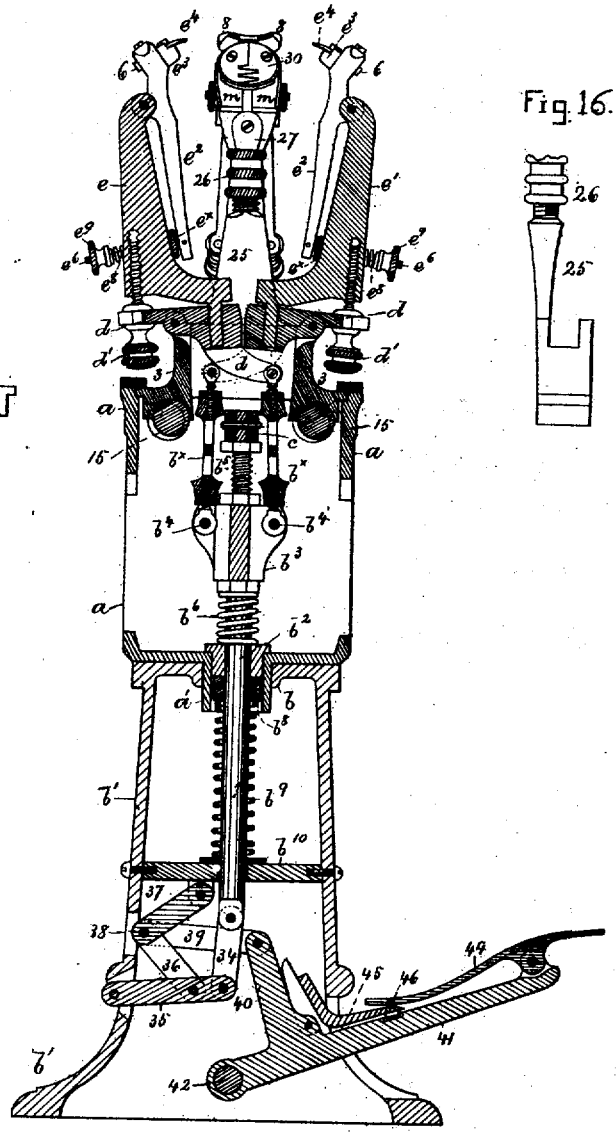
Fig. 15.
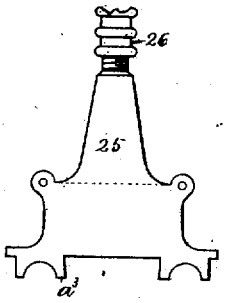
Fig. 16.
Witnesses.
L. F. Connor.
H. E. Whitney
Inventor.
Charles H. Trask, and
Henry F. Wheeler,
by Crosby & Gregory Atty.
THE NORRIS PETERS CO., PHOTO-LITHO., WASHINGTON, D. C.

C. H. TRASK & H. F. WHEELER,

Assignors to the LYNN LASTING MACHINE ASSOCIATION.

Machinery for Lasting Boots and Shoes.

No. 8,627. Reissued Mar. 18, 1879.

Witnesses.

L. F. Connor

N. E. Whitney

Inventor.

Charles H. Trask, and

Henry F. Wheeler.

by Crosby & Gregory,

Attys

THE NORRIS PETERS CO., PHOTO-LITHO., WASHINGTON, D. C.

UNITED STATES PATENT OFFICE.

CHARLES H. TRASK, OF LYNN, AND HENRY F. WHEELER, OF BOSTON, MASS., ASSIGNORS TO THE LYNN LASTING MACHINE ASSOCIATION.

IMPROVEMENT IN MACHINERY FOR LASTING BOOTS AND SHOES.

Specification forming part of Letters Patent No. 142,657, dated September 9, 1873; Reissue No. 8,627, dated March 18, 1879; application filed December 16, 1878.

*To all whom it may concern:*

Be it known that we, CHARLES H. TRASK of Lynn, of the county of Essex, and HENRY F. WHEELER, of Boston, of the county of Suffolk, and State of Massachusetts, have invented a new and useful Improvement in Machinery for Lasting the Uppers of Boots or Shoes; and do hereby declare the same to be fully described in the following specification and represented in the accompanying drawings, of which—

Figure 1:
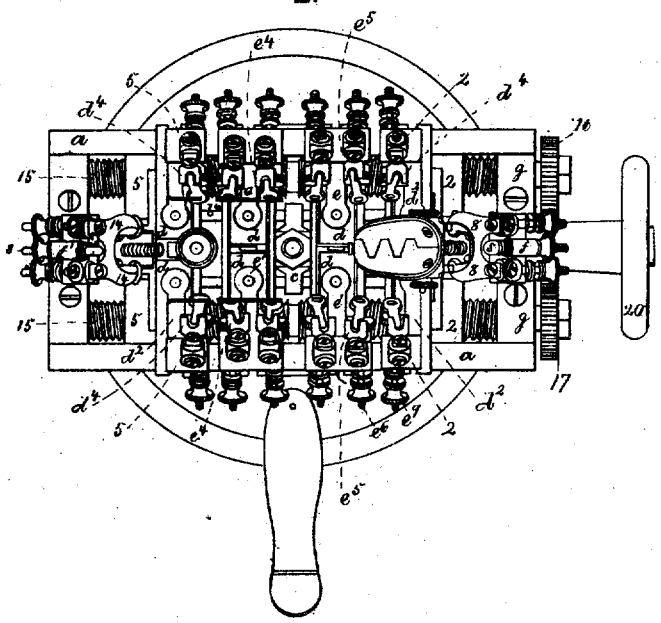
Figure 14:
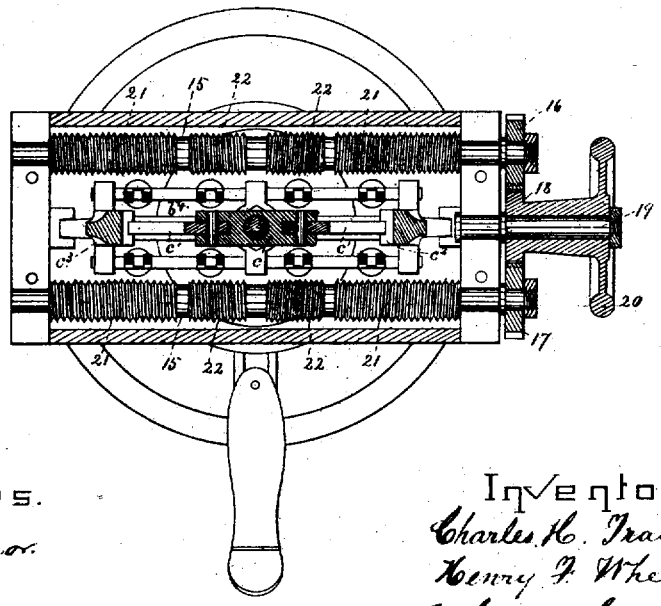
Figure 2:
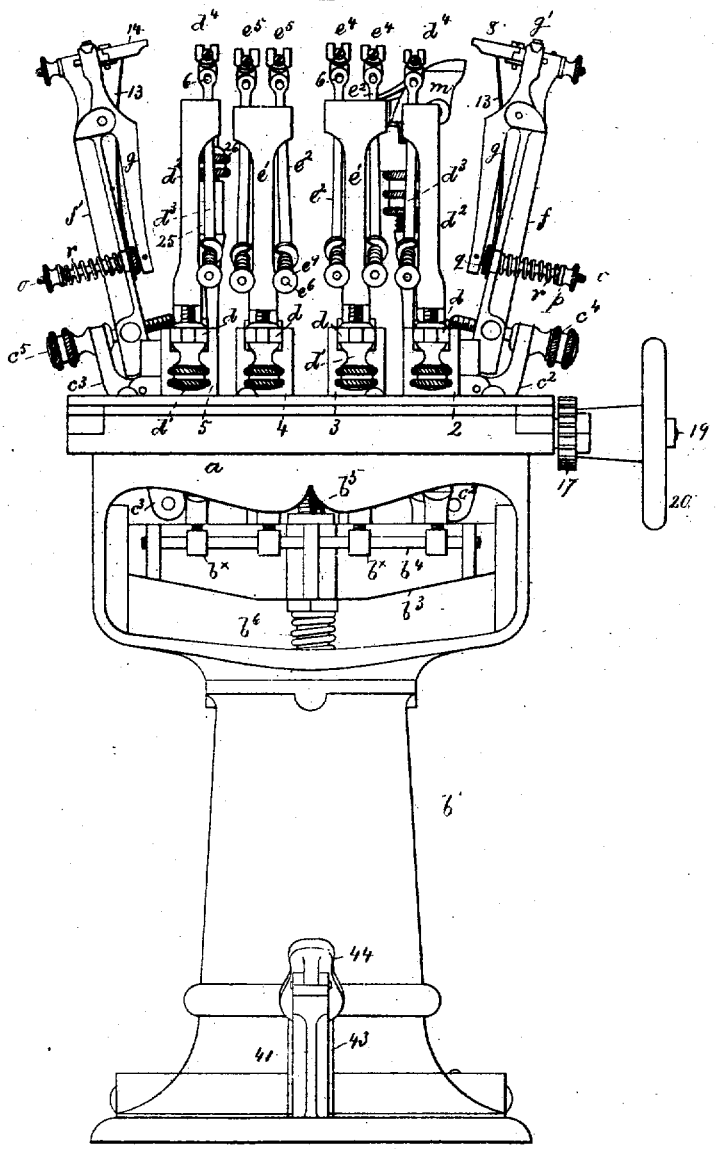
Figure 3:
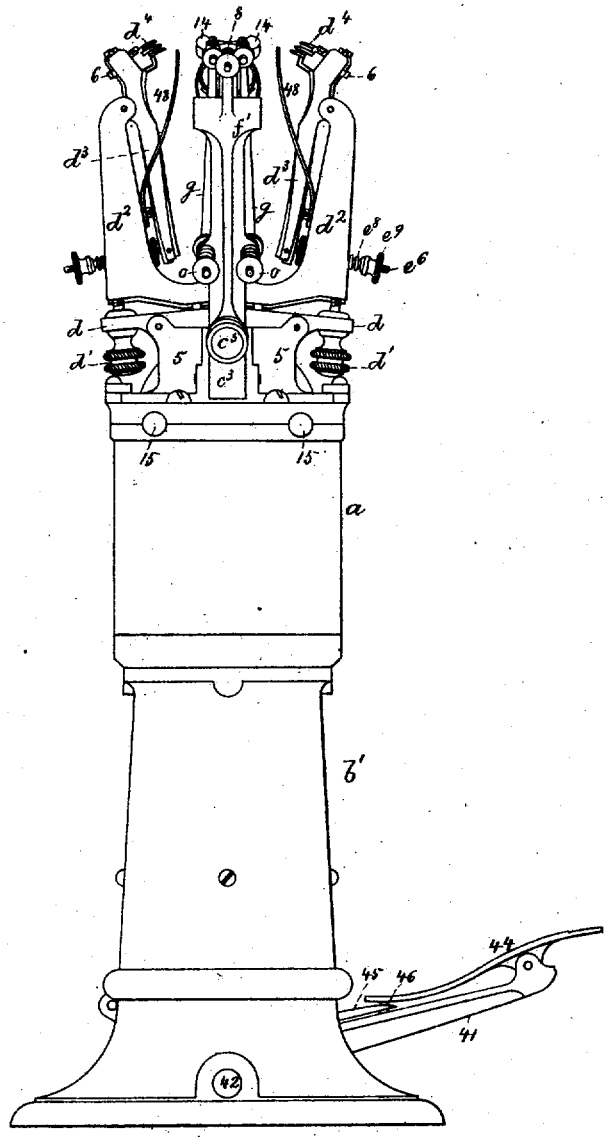
Figure 4:
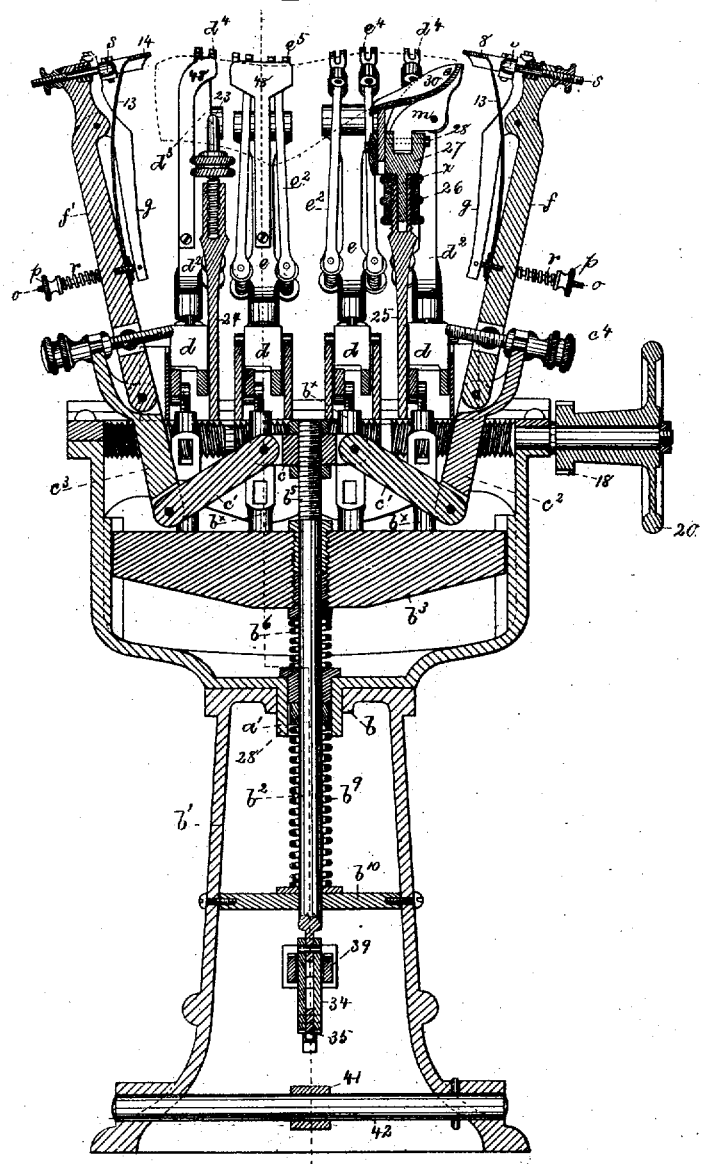
Figure 6:
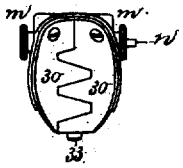
Figure 7:
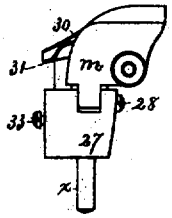
Figure 8:
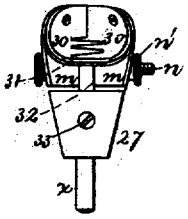
Figure 9:
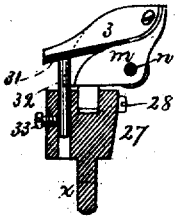
Figure 10:
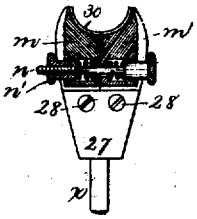
Figure 13:
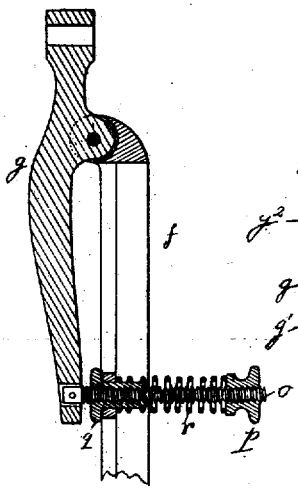
Figure 11:
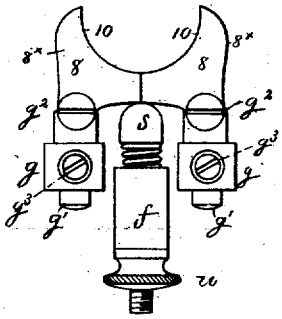
Figure 12:
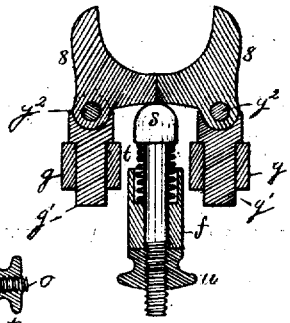

Figure 1 is a top view, Fig. 2 a front elevation, Fig. 3 an end elevation, Fig. 4 a longitudinal section, and Fig. 5 a transverse section, of a machine embodying our invention. Fig. 6 is a top view of the last-support; Fig. 7, a side elevation; Fig. 8, a front view; Fig. 9, a longitudinal section, and Fig. 10 a transverse section thereof. Fig. 11 is a top view; Fig. 12, a horizontal section, on an enlarged scale, of the pair of toe-jaws; Fig. 13, a detail of their support; Fig. 14, a longitudinal horizontal section of Fig. 2, and Figs. 15 and 16 details of the toe-support.

The head $a$, which supports the parts of the machine that co-operate to lay the edges of the upper over upon the inner sole placed upon the last-bottom, has a sleeve, $a^1$, fitted to a socket, $b$, at the top of the base $b^1$, so as to revolve thereon about the operative spindle $b^2$ of the machine, the said spindle being extended at its upper end through a slide-bar, $b^3$, having two longitudinal rods, $b^4$. This spindle $b^2$, at its extreme upper end, is provided with a screw-thread, $b^5$, to enter holes in, and by nuts (see Fig. 4) be connected with, a cross-head, $c$, which, by links $c^1$, is joined with the levers $c^2$ $c^3$, having their fulcra on the carriages 2 5.

The slide-bar $b^3$ is held pressed upward by a spring, $b^6$, so as to cause the rods $b^4$, carried by it, through the adjustable links $b^\times$, composed each of two threaded rods and a central swiveling nut, as shown at Fig. 5, to move the inner ends of the levers $d$ upward, the said levers having their fulcra on the carriages 2 3 4 5, to thereby turn the said levers, so as to throw the side and shank lasting devices away from the last and upper thereon.

The lower ends of the links $b^\times$ are free to slide on the rods $b^4$ as the carriages are moved in the direction of the length of the last, and by adjusting the length of these links $b^\times$ the lasting devices actuated by the levers $d$ may be made to terminate their inward or closing-in movement more or less near the center of the last, thereby enabling the said lasting devices to be closed for a greater or less distance over and beyond the edges of the inner sole at the ball, shank, and other portions thereof. This spindle $b^2$ has a fixed collar, $b^8$, against which, at its lower side, bears a spring, $b^9$, supported at its lower end upon the plate $b^{10}$ of the base, and the said spring elevates the cross-head, so as to throw the levers $c^2$ $c^3$ into the position shown in Fig. 4, or away from the toe and heel of the last.

Each carriage 2 3 4 5 has pivoted to it at opposite sides of the head two levers, $d$, having their inner and lower ends (see Fig. 5) connected with the adjustable links $b^\times$, before described, and their outer ends are provided with adjusting-screws $d^1$, so connected with the said levers as to rotate, but not move longitudinally, and at one side of their fulcra the levers $d$ have projections with suitable sockets, to receive pins at the lower ends of the arms or carriers $e$ $e^1$ for the side and shank lasting fingers, the said pins and sockets acting to guide and steady the said arms $e$ $e^1$ as they are raised or lowered by the adjusting-screws $d^1$, they placing each of the said arms and their lasting-fingers, to be hereinafter described, at the required vertical position to conform to any variation or curvature of the last-bottom between its toe and heel.

The arms $e$ $e^1$ of each carriage 3 4 are each shown as carrying two levers, $e^2$ $e^3$, pivoted thereto, as shown in Figs. 3 and 5. These levers $e^2$, at their upper ends, are each provided with holes to receive the shanks 6 of the heads $e^3$, upon which are screwed the fingers or closing-in devices $e^4$ $e^5$, which act upon the edges of the upper at the ball and shank of the last, and crowd said edges over upon the inner sole upon the last.

The heads $e^3$ are adjustably held at the upper ends of the levers $e^2$, to permit the fingers to be adjusted horizontally and be turned more or less from a horizontal line, according to the curve and shape of the last.

The fingers are slotted for the passage of tacks or pegs when the fingers are moved horizontally over the bottom of the inner sole; but claim is not herein broadly made to slotted fingers, as we are aware that United States Patent No. 18,152, September 8, 1857, shows a series of vertically-placed arms or fingers, which slotted fingers extend upward and hold the upper at the edges of the last.

The lower ends of the levers $e^2$ have pivoted threaded pins or screws $e^6$, which, extended through arms $d^2$, are provided with spiral springs $e^8$ and nuts $e^9$, the pins $e^6$, between the arms $e$ and $e^1$ $e^2$, having nuts $e^\times$, the said nuts serving to adjust and hold the upper ends of the levers $e^2$ in such position that the fingers carried at their upper ends will move forward in the proper curved paths or arcs to correctly impinge against the upper upon the last at the proper time and press it over upon the inner sole, and in their final closing-in movement the springs $e^8$ permit the levers to yield and the fingers to rise a little, to correspond with variation in the thickness of the upper and inner sole.

The fingers $e^5$ last the shank, and those $e^4$ the ball portion of the boot or shoe. The toe and heel carriages 2 5 are each provided with a lever, $d$, an arm, $d^2$, a lever, $d^3$, and adjustable fingers $d^4$, and these parts are constructed and operated substantially like the parts $d$ $e$ $e^1$ $e^2$ $e^4$ $e^5$, but acting upon the upper at the side of the last near its toe and heel.

In addition to the devices already described, the toe-carriage 2 supports the lever $c^2$, provided at its upper end with an adjusting-screw, $c^4$, which enters a threaded hole in a pin held by the arm $f$, pivoted upon the lever $c^2$, and the heel-carriage 5 has a lever, $c^3$, provided with a similar adjusting-screw, $c^5$, and a lever, $f'$, pivoted at its lower end upon lever $c^3$.

The toe-lever $f$ has pivoted upon it two levers, $g$, (see Figs. 1, 4, and enlarged details, Figs. 11, 12, 13,) provided at their upper ends with sockets, into which fit the slides or arms $g^1$, which have pivoted upon them the toe-lasting jaws 8, the connection of the said jaws with their stems and with the levers by a screw, $g^3$, being such as to permit the jaws to be opened and closed, they then turning about the pivots $g^2$, and to be adjusted by turning the stems $g^1$ in the levers, which latter adjustment will cause the outer portions, $8^\times$, of the jaws to be placed at the level with or lower than the portions 10, to enable the jaws to be adapted to the shape of the last at its outer and inner edges next the toe. Thus it will be seen that the slides $g^1$ are capable of sliding and revolving in the sockets at the upper ends of levers $g$.

A screw, $o$, pivoted to the lower arm of the lever $g$, extends through the arm $f$, and is furnished with two nuts, $p$ $q$, and a helical spring, $r$, which are arranged relatively to each other and the lever and arm in the manner as shown in Figs. 2 and 3, and more particularly in Fig. 13, which is a vertical section taken through the screw, the lever, and the arm.

The spring allows the jaw 8 to yield back when forced against the upper, the screw and nuts serving to adjust the lever $g$ and vary the pressure of the spring, as occasion may require.

The pair of jaws 8 8 rest against the head of a screw, $s$, arranged with respect to them, as shown. This screw goes through the upper part of the arm $f$, a helical spring, $t$, is arranged in the arm, as shown, and there is upon the screw a nut, $u$, which operates to adjust or regulate the forward movement of the screw. The spring forces the jaws 8 asunder, as occasion may require.

The joint or opening between the heels of the jaws is spanned or covered by a guard-spring, 13, fixed to the arm $f$, as shown. This guard-spring prevents the leather of the upper from being caught and pinched between the heels of the jaws.

The screw $c^4$, applied to the upper arm of the lever $c^2$ and to the arm $f$, in manner as exhibited, serves to adjust the arm $f$ with reference to the lever as a shorter or longer last may require, and according to its curve.

The heel-jaws 14 are made like the jaws 8, and are combined with another lever, $f'$, by appliances like those described as appertaining to the said jaws 8, all such appliances of the jaws being represented in the drawings.

The rod $b^2$ being drawn downward, the toggles will be made to operate the levers $f$ $f'$ in a manner to cause the heel and toe jaws to be moved toward the last.

The several carriages 2 3 4 5 are to be applied to the frame $a$, so as to be capable of being moved longitudinally thereon.

Extending lengthwise of the frame, and underneath the series of carriages, are two screw-shafts, 15, carrying gears 16 17, which engage with a pinion, 18, arranged between them, and fixed upon a shaft, 19, provided with a hand-wheel, 20, the whole being arranged with and applied to the frame, as shown in Fig. 14, which is a horizontal section taken through such frame and screw-shafts.

Upon each shaft 15 is a series of worms, 21 22, to engage with and move the carriages, the two outer worms, 21, having a pitch to their threads that will cause the two outer carriages to move twice as fast as the two inner ones operated by worms 22.

Each carriage has a stud or screw thread or threads to extend down into the operating-screw.

By turning the hand-wheel the two screw-shafts will be simultaneously revolved, and, as a consequence, motion will be communicated to the several carriages, so as to cause them either to approach toward or recede from each other to aid in adjusting the heel and toe and side and shank lasting devices to the last, whatever may be its size.

The carriage 4 carries the adjustable heel-support 23, screwed into the upper end of the standard 24, attached to the said carriage.

The toe-carriage 2 has attached to and moving horizontally with it the standard 25, having at its top a socket, a screw-thread, and a hollow adjusting-nut, 26, (see Fig. 4,) to receive within them the downwardly-projecting rod or stem $x$ of the head 27 of the toe-rest, to permit it to turn axially or swivel in the end of 25, and to be raised or lowered by simply turning the nut 26.

The toe-rest is mainly composed of two concaved jaws, $m$ $m$, and a head, 27, the said jaws being hinged to the head at 28, so as to be capable of turning or spreading, or moving apart from one another. Within these jaws is a screw, $n$, a nut, $n'$, and there are also two helical springs, arranged as shown in Fig. 10, the springs serving to close the jaws or press them toward one another.

The upper on the last is acted upon at the instep and toe of the last by facing-pieces 30, of leather or vulcanized india-rubber, the said facing-pieces being at their upper edges confined to the outer edges of the concaved jaws $m$ $m$, hinged or pivoted upon the head 27, so as to spread apart or separate as the last and upper upon it is pressed downward into and between the said jaws.

The edges of the facing-pieces which so bear upon the upper separate at or about a line drawn from the center of the toe along the instep, and in so spreading apart the force of the spiral springs on the screw $n$ must be overcome.

Nuts $n'$ govern the force of the said springs, causing the facing-pieces to be crowded against the upper with the desired amount of pressure before they separate, thereby fitting the last and upper closely.

The facing-pieces extend from the toe of the upper back along the instep, and at their rear ends are held up by an adjustable supporter, 31, (see Figs. 7, 9,) having its shank 32 inserted in the head 27 and held by a screw, 33.

The edges of the facing-pieces 30 are toothed or notched to project across the opening between the jaws, to prevent the upper being crowded into the space between the parts 30 and jaws when spread apart.

This toe-support, constructed as described, will readily adapt itself to fit and support the toe of a last, however it may vary in width or shape.

This machine, provided with a system of heel and toe jaws, and of side and shank lasting devices, will, when forced against a shoe-upper on a last held and supported at its heel and at its toe by the toe-support, as shown in dotted lines, Fig. 4, operate to stretch or last the upper upon the last.

The mechanism for effecting depression of the rod $b^2$ may be now described. At its foot the rod is connected by a link, 34, to the inner end of a lever, 35, whose outer end is pivoted to the base $b^1$. Toggles 36 37 connect the lever 35 with a partition, $b^{10}$, going across the base, as shown, the toggles being jointed together and to the lever and partition. From the junction-pin 38 of the toggles links 39 extend, and are pivoted to the upper part of an arm, 40, extending from a pedal-lever, 41, arranged, as shown, to turn upon a shaft, 42, across the base $b^1$. The lever 41 extends through an opening, 43, in the side of the base, and is provided with a foot-rest, 44, or releasing device, which is pivoted to the lever. The toe of the foot-rest extends over and upon a latch or locking device, 45, pivoted to the pedal-lever 41, arranged as represented. The latch at its outer end is notched to receive a headed stud, 46, projecting downward from the toe of the foot-rest, as shown.

By a workman placing his foot upon the foot-rest and pressing downward upon it, the pedal-lever will be forced down, whereby the toggles will be caused to approach the rod $b^2$, and cause it to be drawn downward. After such rod may have been depressed to bring the several jaws and lasting devices up to the last, or against the leather thereon, so as to effect the lasting of it, the workman should, with his foot, force down the toe-rest of lever 44, so as to actuate the lever-latch 45, and cause it to catch upon the base at the slot 43, and hold the lever 41 down and the jaws closed upon the leather on the last. By pressing upon the heel or rear part of the foot-rest the front part of such rest may be raised, so as to move the latch out of engagement with the top of the slot in the base.

As an aid in lasting an upper with this machine, we employ with each finger a spring-presser, 48, connected with the arm $e$ or $e^1$, in manner as shown, such presser, at its foot, being fixed to the arm. These pressers come in contact with the leather at the sides of the last before the jaws act upon it, and moving upward against the upper force and fit it to the last, so that the jaws can turn it over the sole to good advantage.

We claim—

1. In a lasting-machine, a carriage provided with crimping-jaws to turn the edge of the toe of the upper over upon the inner sole, combined with an independent vertically-adjustable toe-rest, and mechanism to move the toe-rest carriage and jaws simultaneously toward and from the last in the direction of its length, substantially as described.

2. In a lasting-machine, a carriage and its attached jaws to crimp or turn over the edge of the upper at the heel, combined with a supporting-pin to enter and hold the last at the heel, and with mechanism to simultaneously move the said devices horizontally in the direction of the length of the last, substantially as described.

3. In a lasting-machine, a device to enter and support the last at its heel, a carriage provided with heel-crimping jaws or plates, a vertically-adjustable toe-support, a carriage and jaws carried by it to crimp the toe of the upper and lay it over upon the inner sole, combined with screws to automatically move the said carriages and heel and toe supports horizontally in the direction of the length of the last, substantially as described.

4. In a lasting-machine, a horizontally-moving carriage and jaws for crimping or turning the edge of the upper at the toe over upon the inner sole, combined with a heel-support and an independent toe-support disconnected from the heel-support, and devices to adjust the said toe-support vertically with relation to the line of movement or action of the said jaws, substantially as described.

5. A horizontally-moving carriage and jaws connected with it to crimp the toe of the upper over upon the inner sole, combined with a toe-rest and an independent heel-support, the toe-support being adapted to be turned axially about a vertical pivot without disturbing the position of the heel-support, substantially as described.

6. In a lasting-machine, a toe-rest connected with its support to permit the toe-rest to rock and swivel horizontally and oscillate, substantially as described.

7. In a lasting-machine, crimping jaws or plates for turning the edges of the upper at its toe over upon the inner sole, combined and connected loosely with mechanism to move the said jaws or plates horizontally over the inner sole, whereby the said jaws or plates may be oscillated to adapt their under surfaces and working edges to the shape of the last-bottom and inner sole and upper thereon from side edge to side edge of the last.

8. In a lasting-machine provided with heel and toe crimping jaws or plates, side lasting fingers or devices, and mechanism to adjust them vertically with relation to the closing-in movement of the heel and toe crimping jaws or plates, to adapt the said fingers to the curvature of the last-bottom between its heel and toe, combined with side-lasting fingers and mechanism to adjust them horizontally with relation to the devices which move them over the inner sole, to adapt some of the said fingers to approach more nearly than other of the said fingers to the center of the last, to thereby enable the said fingers to crowd the upper over the edges of the inner sole, whatever may be the outline of the inner sole or last at its ball and shank portions.

9. Crimping jaws or plates for crimping the upper over upon the inner sole at its toe, combined with adjusting devices to place the said jaws or plates in a position more or less inclined from a horizontal line, to adapt the under surfaces of the jaws or plates to the longitudinal curve of the last-bottom and inner sole thereon at or near the toe of the last.

10. In a lasting-machine, toe-crimping jaws or plates, a toe-carriage, and a screw to move the carriage horizontally, combined with holding and actuating devices for the jaws, and mechanism to adjust the said jaws and their actuating devices to move in a path more or less inclined from the horizontal path or line of movement of the said carriage, substantially as described.

11. In a lasting-machine, two facing-pieces fixed at their outer edges and disconnected at their inner edges, to permit the said facing-pieces (which press and fit the upper at its toe and instep against the toe and instep of the last) to separate at or near a line drawn from the center of the toe along the instep in the direction of the length of the last, substantially as described.

12. In a lasting-machine, two facing-pieces fixed at their outer edges and disconnected at their inner edges, to permit the said facing-pieces (which press and fit the upper at its toe and instep against the toe and instep of the last) to separate at or near a line drawn from the center of the toe along the instep in the direction of the length of the last, combined with springs to control the amount of pressure required to cause the facing-pieces to separate.

13. A divided toe-support composed of two pivoted blocks, springs to hold them together, and divided facing-pieces connected with the blocks and made separable, substantially as described.

14. In a lasting-machine, a toe-rest for the extreme toe of the last, combined with an independent vertically-adjustable support at the rear of the toe-rest, substantially as described.

15. In a lasting-machine, a heel-support, a carriage made movable in the direction of the length of the last, and side-lasting devices thereon, combined with a carriage and toe-lasting jaws or plates, and a vertically-adjustable toe-rest connected therewith, and a screw to move the latter carriage horizontally toward and from the toe of the last, substantially as described.

16. The toe-support provided with the yielding jaws and intertoothed facing-pieces, substantially as described.

17. The jaws 8 and their slides and their holding-levers, combined with a lever-actuating arm and an adjustable yielding screw, *s*, substantially as described.

18. The arm $c^2$, the lever *f* pivoted thereon, and jaws or slides moved by the lever, combined with the adjusting-screw $c^4$, substantially as described.

19. The slide-bar $b^3$, its attached rods $b^4$, and the levers *d*, combined with the adjustable connecting-links $b^x$, to operate substantially as described.

20. In a lasting-machine, the toggles 36 37, the lever 35, the links 39 and 34, combined with the levers 40 41, substantially as described.

21. In a lasting-machine, independent spring-pressers adapted to operate upon the upper at the sides of the last and move toward the edges of the last-bottom as the upper and last are fitted in close contact, combined with side-lasting fingers to subsequently close-in and lay upon the inner sole the inner edges of the upper at the sides of the last, substantially as described.

22. In a lasting-machine provided with heel and toe crimping jaws or plates and side and shank lasting devices, the operative spindle $b^2$, combined with a toggle-joint at its lower end, and a treadle or lever to straighten or spring the toggle, to thereby actuate the lasting devices to press the edges of the upper over upon the inner sole, or to move away from the upper, substantially as described.

CHARLES H. TRASK.
HENRY F. WHEELER.

Witnesses:
GEO. W. GREGORY,
N. E. WHITNEY.